United States Patent
Ma (10) Patent No.: US 10,742,694 B2
(45) Date of Patent: Aug. 11, 2020

(54) METHOD FOR MIGRATING DATA AND TERMINAL

(71) Applicant: Guangdong Oppo Mobile Telecommunications Corp., Ltd., Dongguan, Guangdong (CN)

(72) Inventor: Zhifeng Ma, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 20 days.

(21) Appl. No.: 16/283,170

(22) Filed: Feb. 22, 2019

(65) Prior Publication Data

US 2019/0190968 A1 Jun. 20, 2019

Related U.S. Application Data

(63) Continuation of application No. PCT/CN2017/092283, filed on Jul. 7, 2017.

(30) Foreign Application Priority Data

Sep. 14, 2016 (CN) .......................... 2016 1 0825433

(51) Int. Cl.
*G06F 9/48* (2006.01)
*H04L 29/06* (2006.01)
(Continued)

(52) U.S. Cl.
CPC ............ *H04L 65/4023* (2013.01); *G06F 8/61* (2013.01); *G06F 9/4856* (2013.01);
(Continued)

(58) Field of Classification Search
CPC ... H04L 65/4023; H04L 67/06; G06F 9/4856; G06F 16/119; G06F 8/61; H04W 76/10; H04W 84/12
See application file for complete search history.

(56) References Cited

U.S. PATENT DOCUMENTS 9,445,155 B2 * 9/2016 Goncalves ....... H04N 21/47202
9,507,630 B2 * 11/2016 Addepalli ............... G06F 9/461
(Continued)

FOREIGN PATENT DOCUMENTS

CN 102298537 A 12/2011
CN 102546649 A 7/2012
(Continued)

OTHER PUBLICATIONS

Extended European Search Report issued in corresponding European Application No. 17850091.4 dated Jun. 28, 2019.
(Continued)

*Primary Examiner* — Hashim S Bhatti (57) ABSTRACT

A method for migrating data and a terminal are provided. The method includes the following. An application migration instruction is received, and a target application and a target terminal corresponding to the application migration instruction are determined. A target system type of the target terminal and a local system type are acquired. User data of the target application is acquired. When the local system type is not matched with the target system type, the target terminal is instructed to download the target application from an application store. The user data is migrated to the target terminal.

18 Claims, 4 Drawing Sheets

(51) Int. Cl.
*H04W 76/10* (2018.01)
*G06F 16/11* (2019.01)
*G06F 8/61* (2018.01)
*H04L 29/08* (2006.01)
*H04W 84/12* (2009.01)

(52) U.S. Cl.
CPC ............ G06F 16/119 (2019.01); H04L 67/06 (2013.01); H04W 76/10 (2018.02); *H04W 84/12* (2013.01)

(56) References Cited

U.S. PATENT DOCUMENTS

| | | | | |
|---|---|---|---|---|
| 10,587,728 | B2* | 3/2020 | Wu | H04W 4/50 |
| 2013/0219176 | A1* | 8/2013 | Akella | G06F 16/185 |
| | | | | 713/165 |
| 2015/0381766 | A1* | 12/2015 | Yoshida | H04L 67/34 |
| | | | | 709/222 |
| 2016/0162271 | A1* | 6/2016 | Zhi | G06F 8/71 |
| | | | | 717/175 |
| 2016/0253274 | A1* | 9/2016 | Huang | G06F 13/4068 |
| | | | | 710/33 |

FOREIGN PATENT DOCUMENTS

| | | |
|---|---|---|
| CN | 103019770 A | 4/2013 |
| CN | 104239083 A | 12/2014 |
| CN | 105491113 A | 4/2016 |
| CN | 105630587 A | 6/2016 |
| EP | 1215575 A2 | 6/2002 |
| EP | 3001309 A1 | 3/2016 |
| WO | 2016066130 A1 | 5/2016 |

OTHER PUBLICATIONS

"Smart Switch Installation Instructions", i2 May 2013(May 12, 2013), XP055272138, Retrieved from the Internet: URL: http://web.archive.org/web/20130512081344/http://www.samsung.com/us/smart-switch /Smart Switch Install Instructions.pdf [ retrieved on May 12, 2016] the whole document.

International search report issued in corresponding international application No. PCT/CN2017/092283 dated Oct. 11, 2017.

* cited by examiner

METHOD FOR MIGRATING DATA AND TERMINAL

CROSS-REFERENCE TO RELATED APPLICATION(S)

This application is a continuation of International Application No. PCT/CN2017/092283, filed on Jul. 7, 2017, which claims priority to Chinese Patent Application No. 201610825433.X, filed on Sep. 14, 2016, the disclosures of both of which are hereby incorporated by reference in their entireties.

TECHNICAL FIELD

The present disclosure relates to the technical field of terminals, and particularly to a method for migrating data and a terminal.

BACKGROUND

With the development of terminal technology, the speed of updating smart phones, tablets, and other smart terminals is getting faster and faster. When replacing an old mobile phone with a new one, a user does not want to lose data in the old mobile phone due to the replacement of the old mobile phone, but wants to copy desired data in the old mobile phone to the new one. To this end, many service providers or applications now provide a phone transfer function that all data in the old mobile phone, including software, settings, and other data, can be copied to a new mobile phone completely as they were, which facilitates data transfer during mobile phone replacement.

SUMMARY

According to a first aspect of the disclosure, a method for migrating data is provided. The method includes the following. An application migration instruction is received, and a target application and a target terminal corresponding to the application migration instruction are determined. A target system type of the target terminal and a local system type are acquired. When the local system type is not matched with the target system type, the target terminal is instructed to download the target application.

According to a second aspect of the disclosure, a terminal is provided. The terminal includes at least one processor and a computer readable storage. The computer readable storage is coupled to the at least one processor and stores at least one computer executable instruction thereon which, when executed by the at least one processor, causes the at least one processor to carry out part or all of the operations described in the first aspect.

According to a third aspect of the disclosure, a non-transitory computer readable storage medium is provided. The non-transitory computer readable storage medium is configured to store a computer program which, when executed by a processor, causes the processor to carry out part or all of the operations described in the first aspect.

BRIEF DESCRIPTION OF DRAWINGS

To illustrate the technical solutions embodied by the aspects of the present disclosure more clearly, the following briefly introduces the accompanying drawings required for describing the aspects or the related art. Apparently, the accompanying drawings in the following description merely illustrate some aspects of the present disclosure. Those of ordinary skill in the art may also obtain other drawings based on these accompanying drawings without creative efforts.

DETAILED DESCRIPTION

To describe technical solutions in aspects of the present disclosure more clearly, the following briefly introduces the accompanying drawings required for describing the aspects. Apparently, the accompanying drawings in the following description merely illustrate some aspects of the present disclosure. Those of ordinary skill in the art may also obtain other drawings based on these accompanying drawings without creative efforts.

According to aspects of the present disclosure, a method for migrating data is provided. The aspects of the method may rely on computer programs applicable to a von Neumann architecture-based computer system. The computer programs may be an application management system or an application backup and migration system based on an Android® system or an IOS® system, such as Phone Transfer® or a data backup migration and recovery application. The computer system may be a terminal device that runs the computer programs. The terminal device includes, but is not limited to, a smart phone and a tablet computer.

Generally, configuration and a system of a new mobile phone are better than those of an old mobile phone. For example, the system installed on the new mobile phone is Android 6.0 while the system installed on the old mobile phone is Android 5.0, which leads to some applications having different configuration under different system versions. In this case, if all data of one application in the old mobile phone is directly migrated to the new mobile phone, there may be a problem that an original application installed on the old mobile phone is not compatible with the new mobile phone.

Figure 1:
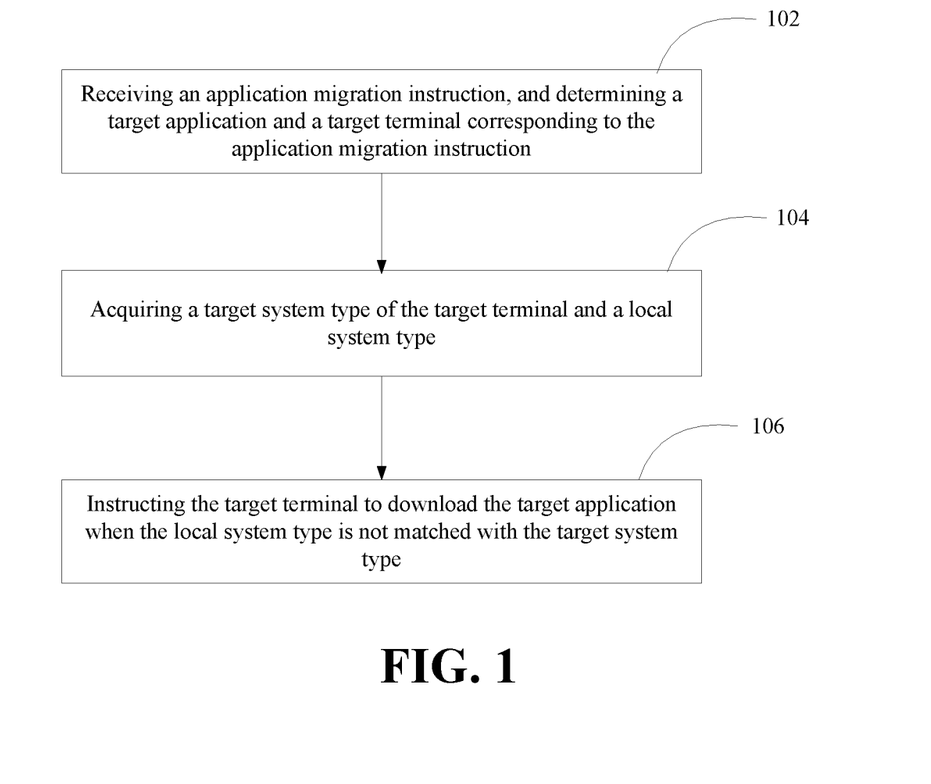
FIG. 1 is a flow chart illustrating a method for migrating data according to an aspect of the present disclosure.

FIG. 1 is a flow chart illustrating a method for migrating data according to an aspect of the present disclosure. The method can be applicable to a terminal (i.e., a source terminal). As illustrated in FIG. 1, the method begins at block 102.

At block 102, an application migration instruction is received, and a target application and a target terminal corresponding to the application migration instruction are determined.

At block 104, a target system type of the target terminal and a local system type are acquired.

At block 106, the target terminal is instructed to download the target application when the local system type is not matched with the target system type.

Figure 2:
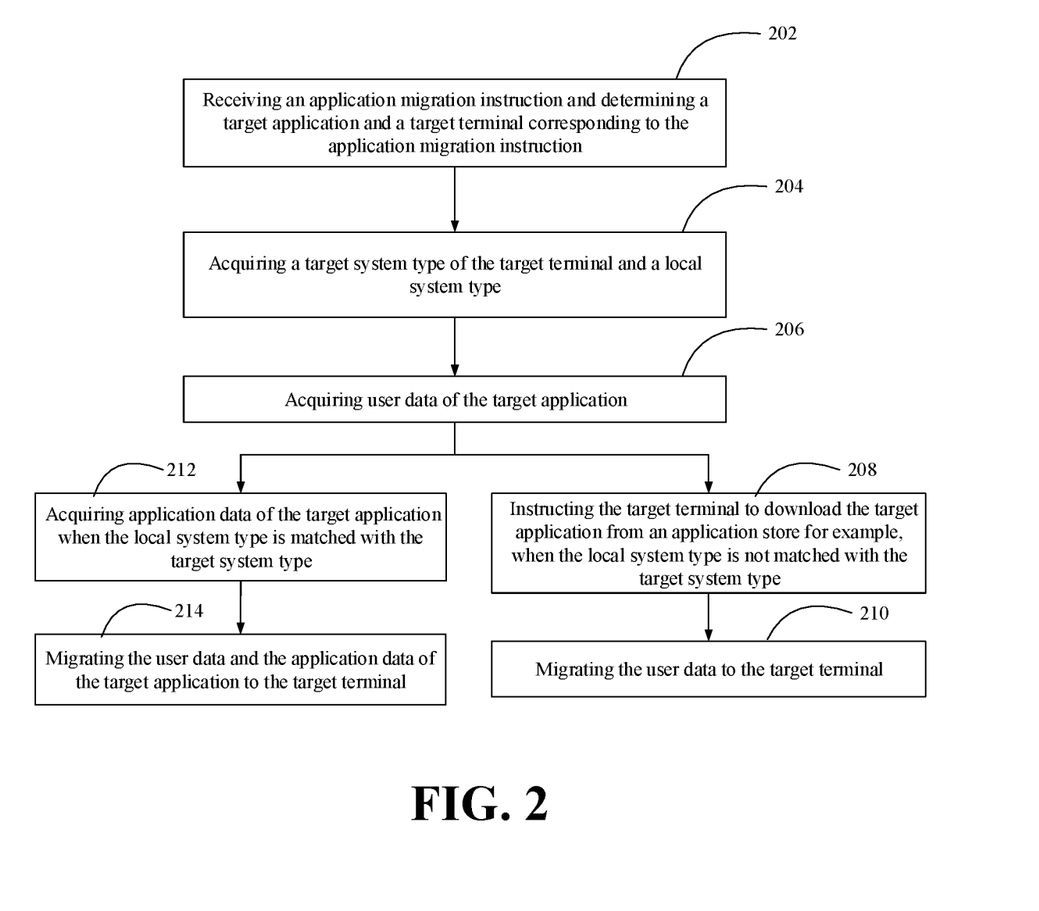
FIG. 2 is a flow chart illustrating a method for migrating data according to another aspect of the present disclosure.

FIG. 2 is a flow chart illustrating a method for migrating data according to another aspect of the present disclosure. The method can be applicable to a terminal (i.e., a source terminal). As illustrated in FIG. 2, the method begins at block 202.

At block 202, an application migration instruction is received, and a target application and a target terminal corresponding to the application migration instruction are determined.

In one aspect, the user may migrate related data of one or more applications in a source terminal to a migration terminal (or can be referred to as a target terminal) by using a data migration application such as Phone Transfer® or other applications for migrating data of an application (hereinafter, the "data of an application" is simply referred to as "data"). That is, related data of a specified application in an old mobile phone is migrated to a new mobile phone. The user may enter an application migration instruction in an operation interface corresponding to one application such as Phone Transfer® or other application for migrating data, where the application migration instruction includes information about an application to be migrated (i.e., a target application) and a migration destination (i.e., a migration terminal or a target terminal). In other words, the application to be migrated and the migration destination can be determined according to the application migration instruction.

The method provided herein is based on the source terminal. That is, the method is applicable to a terminal device where the application to be migrated is installed, and the input and the reception of the application migration instruction are performed on the source terminal.

In this aspect, after the target terminal is determined, a communication connection between the source terminal and the target terminal needs to be established, that is, a channel for data transmission between the two terminals is established for subsequent data transmission.

In one aspect, the method further includes the following after the target application and the target terminal corresponding to the application migration instruction are determined. A communication connection with the target terminal is established. When the communication connection is established successfully, the method proceeds to block 204; otherwise, a notification message indicating that the communication connection fails to be established is generated and displayed.

That is to say, after the application migration instruction is detected, before further operations, we need to determine whether the communication connection between the target terminal and the source terminal is successfully established first. If the communication connection is not established successfully, the subsequent data transmission will not be successful. In order to avoid the problem that useless operation for subsequent data transmission is conducted in the case that data transmission is impossible to be executed successfully, in this aspect, we first determine whether the communication connection is established successfully. When the communication connection fails to be established, a corresponding notification message indicating that the communication connection fails to be established is generated to be displayed on a display interface of the source terminal, which aims to prompt the user that the channel for data transmission of current migration fails to be established and to prompt the user to try again.

In a possible aspect, after the source terminal determines the target terminal, if no communication connection with the target terminal can be established, count time elapsed since the target terminal is determined. When the time exceeds a preset threshold, the source terminal will automatically send a request for establishing a communication connection to the target terminal, thereby increasing the probability of establishing a communication connection with the target terminal successfully, and facilitating completing data migration between the terminals.

At block 204, a target system type of the target terminal and a local system type are acquired.

In this aspect, examples of a system type of a terminal include but are not limited to an Android® system, an iPhone® operating system (iOS). Further, the system type corresponds to a specific system version, for example, Android 5.0, IOS 9, and so on. In this aspect, system types to be considered include a system type of an old mobile phone as the source terminal (i.e., the local system type) and a system type of a new mobile phone as the target terminal (i.e., the target system type). In one aspect, the source terminal can acquire information about the target migration and the source terminal, and the information acquired includes but not limited to the target system type of the target terminal and the local system type. In other words, the target system type of the target terminal and the local system type can be determined.

When the system type of the target terminal is the same as or is matched with that of the source terminal, application data in the source terminal will be applicable to the target terminal. On the other hand, when the system type of the target terminal is different from or is not matched with that of the source terminal, there may be a problem that the application data in the source terminal cannot be used in the target terminal.

In this aspect, in terms of whether the local system type is matched with the target system type, the following will be discussed separately. One case is that the local system type is matched with the target system type and the other case is that the local system type is not matched with the target system type.

Before discussing in detail, we need to acquire user data corresponding to the target application at block 206.

At block 206, user data of the target application is acquired.

In this aspect, the user data refers to data irrelevant to installation files of an application or irrelevant to a terminal system for example, such as historical data or the like. Generally, data corresponding to an application includes user data and application data (e.g., installation files, related files written-in during installation, and so on).

After the user data of the target application is acquired, when the local system type is not matched with the target system type, the method proceeds to block 208; otherwise, the method proceeds to block 212.

At block 208, the target terminal is instructed to download the target application from an application store (i.e., a management tool that provides users with the ability to download, install, upgrade, and uninstall software or applications) for example, when the local system type is not matched with the target system type.

In actual, the target terminal may be in a mobile data network. To avoid excessive data traffic consumption and high data traffic cost of the target terminal due to download of the target application, it is necessary to first determine whether the target terminal is in a wireless fidelity (Wi-Fi) network. In one aspect, when determining that the target terminal is not in a Wi-Fi network, the source terminal may first instruct the target terminal to switch to the Wi-Fi network from a mobile data network before instructing the target terminal to download the target application, and then the target terminal can download the target application after connecting to a Wi-Fi network.

At block 210, the user data is migrated to the target terminal.

When the local system type is not matched with the target system type, if application data in the source terminal is migrated to the target terminal, the application data migrated may not be able to run on the target terminal, or may fail. Therefore, in this aspect, when the local system type is not matched with the target system type, instead of migrating the application data in the source terminal, the source terminal will send an application download instruction to the target terminal to instruct the target terminal to download a corresponding target application in an application store. The target terminal may download the application data corresponding to the target application from the application store according to its own target system type, the application data downloaded as such can be normally operated on the target terminal.

Further, after the application data is downloaded, the user data in the source terminal will be migrated to the target terminal, in this way, download of the application data and migration of the user data are completed. Therefore, the target terminal has all data corresponding to the target application. In this case, the user can use the target application in the target terminal normally, and can also use the user data such as historical data migrated from the source terminal.

At block 212, the application data of the target application is acquired when the local system type is matched with the target system type.

At block 214, the user data and the application data of the target application are migrated to the target terminal.

When the local system type is matched with the target system type, that is, the system type of the source terminal is the same as that of the target terminal, application data of the source terminal and the target terminal with the same system type are consistent. In other words, application data downloaded by the target terminal from an application store is consistent with application data acquired from the source terminal, therefore, application data of the target terminal can be obtained through either download or migration.

In this aspect, considering that downloading application data from the application store consumes data traffic and requires Internet connection, original application data can be migrated directly from the source terminal to the target terminal.

In this aspect, in addition to historical data generated in the process of using a corresponding application, the user data further includes files created, files modified, and files read-out or written-in when using or running the corresponding application. The above files should be migrated together with user data during data migration.

In one aspect, the method further includes the following. An application installation event is detected, and an installing application and files written-in corresponding to the application installation event are acquired (in other words, the installing application and the files written-in are determined). Mark the files written-in as application data of the installing application. Mark data written-in when running the installing application as user data of the installing application.

In one aspect, the method further includes the following. At least one first file corresponding to the target application is acquired. At least one second file marked as user data is selected, from the at least one first file acquired, as the user data of the target application.

That is, in the process of installation of an application, installation files used for installation refer to application data corresponding to the application. In addition, some data needs to be written into a system or other files during installation of the application, and these files written-in also refer to the application data corresponding to the application. In this aspect, in order to distinguish the application data from the user data during the data migration process, when corresponding data is generated, the file will be marked as application data.

Further, data generated during running of the application refers to user data. For example, related data written-in when the user uses the application refers to user data. Accordingly, the data generated during running of the application is marked as user data.

After all the data corresponding to the target application is marked as application data or user data, when acquire the user data of the target application at block 206, all files corresponding to the target application can be searched according to the target application, and files marked as user data will be selected from all files searched. At this time, the files selected are the user data of the target application required at block 206.

In this aspect, the source terminal can transmit the user data to the target terminal. In one aspect, the method further includes the following. A storage path of the user data in the source terminal is transmitted to the target terminal, so that the target terminal can store the data sequentially according to the storage path of the user data in the source terminal.

Figure 3:
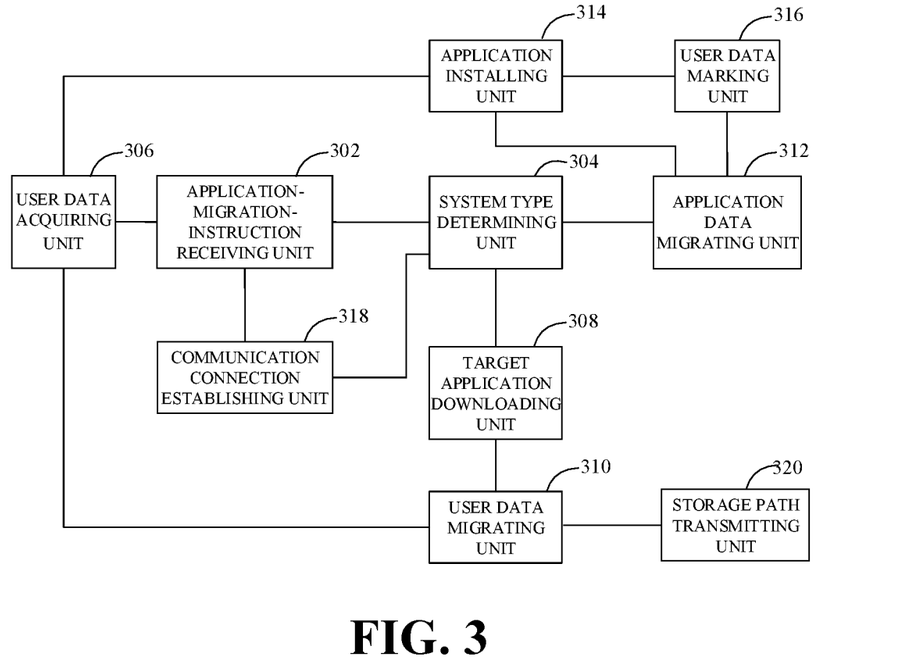
FIG. 3 is a block diagram illustrating a device for migrating data according to an aspect of the present disclosure.

A device for migrating data is further provided according to an aspect of the present disclosure. As illustrated in FIG. 3, the device includes an application-migration-instruction receiving unit 302, a system type determining unit 304, a user data acquiring unit 306, a target application downloading unit 308, and a user data migrating unit 310.

The application-migration-instruction receiving unit 302 is configured to receive an application migration instruction and to determine a target application and a target terminal corresponding to the application migration instruction.

The system type determining unit 304 is configured to acquire a target system type of the target terminal and a local system type.

The user data acquiring unit 306 is configured to acquire user data of the target application.

The target application downloading unit 308 is configured to instruct the target terminal to download the target application from an application store when the local system type is not matched with the target system type.

The user data migrating unit 310 is configured to migrate the user data to the target terminal after the target terminal downloads the target application.

In one aspect, as illustrated in FIG. 3, the device further includes an application data migrating unit 312. The application data migrating unit 312 is configured to acquire application data of the target application when the local system type is matched with the target system type, and to migrate the user data and the application data of the target application to the target terminal.

In one aspect, as illustrated in FIG. 3, the device further includes an application installing unit 314 and a user data marking unit 316. The application installing unit 314 is configured to detect an application installation event, to acquire an installing application and files written-in corresponding to the application installation event, and to mark the files written-in as application data of the installing application. The user data marking unit 316 is configured to mark data written-in when running the installing application as user data of the installing application.

In one aspect, the user data acquiring unit 306 is further configured to acquire at least one first file corresponding to the target application and to select, from the at least one first file acquired, at least one second file marked as user data as the user data of the target application.

In one aspect, as illustrated in FIG. 3, the device further includes a communication connection establishing unit 318. The communication connection establishing unit 318 is configured to establish a communication connection with the target terminal, and to invoke the system type determining unit 304 when the communication connection is established successfully, or to generate and display a notification message indicating that the communication connection fails to be established when the communication connection fails to be established.

In one aspect, the device further includes a storage path transmitting unit 320. The storage path transmitting unit 320 is configured to acquire a storage path of the user data of the target application, and to transmit the storage path of the user data to the target terminal.

According to the aspects of the disclosure, functional units may be divided for a user terminal in accordance with the foregoing method examples. For example, functional units may be divided according to corresponding functions, and two or more functions may be integrated into one processing unit. The above-mentioned integrated unit can be implemented in the form of hardware or software functional units. In one aspect, the application-migration-instruction receiving unit 302, the system type determining unit 304, the user data acquiring unit 306, the target application downloading unit 308, and the user data migrating unit 310 may be integrated into a central processing unit (CPU). It should be noted that the division of units in the aspects of the present disclosure is schematic and is merely a logical function division. There may be other division manners in actual implementation.

By adopting the method and the device for migrating data, when data corresponding to the target application in the source terminal is migrated, whether to migrate corresponding application data is determined according to system type of the source terminal and system type of the target terminal. That is, in the case that the system type of the source terminal is not matched with that of the target terminal, the target terminal will download the corresponding application data from the application store by itself for example, so that only the user data needs to be transmitted from the source terminal. By means of the method and the device for migrating data, it is possible to avoid a situation where the migrated application data is unavailable due to mismatch between the system type of the source terminal and the system type of the target terminal, thereby improving the compatibility of migrated data and improving the user experience.

Figure 4:
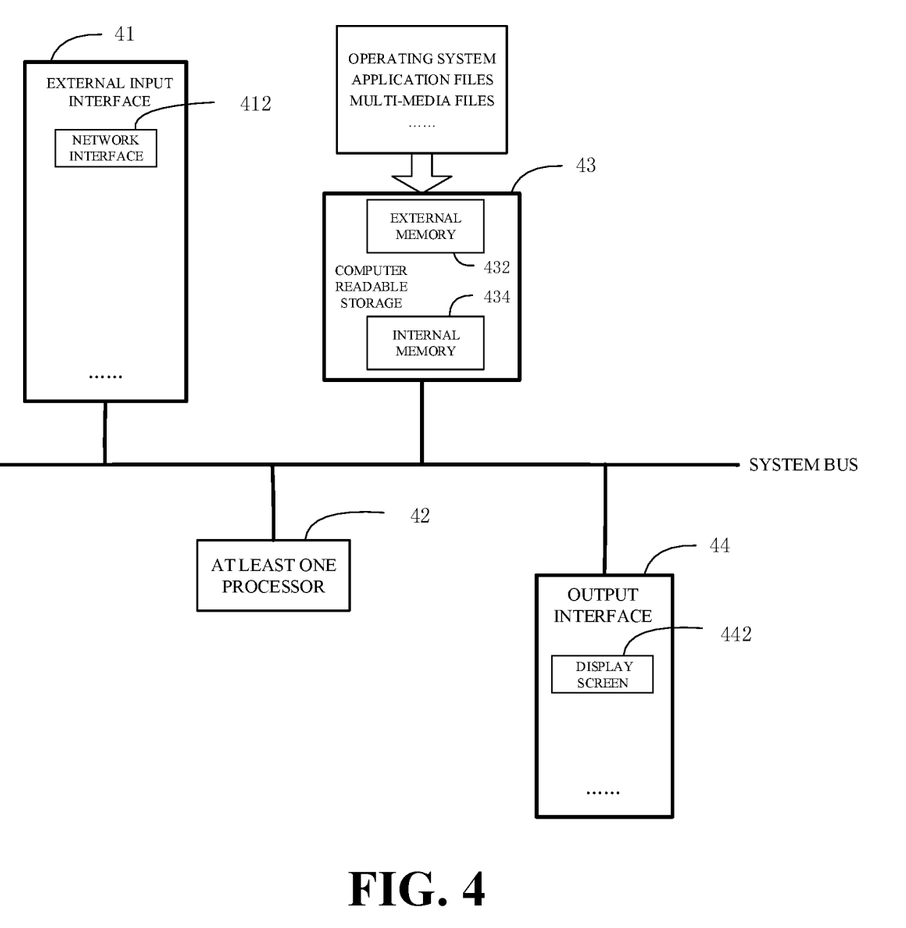
FIG. 4 is a block diagram illustrating a terminal running the method for migrating data according to an aspect of the present disclosure.

According to aspects of the present disclosure, a terminal is further provided. FIG. 4 illustrates a terminal of a von Neumann architecture-based computer system that runs the method for migrating data. The computer system can be a terminal device such as a smart phone, a tablet computer, or a palmtop computer. As illustrated in FIG. 4, the terminal includes an external input interface 41, at least one processor 42, a computer readable storage (for example, a memory) 43, and an output interface 44 that are coupled via a system bus. The computer readable storage 43 is coupled to the at least one processor 42 and stores at least one computer executable instruction thereon which, when executed by the at least one processor 42, causes the at least one processor 42 to carry out the following actions. An application migration instruction is received, and a target application and a target terminal corresponding to the application migration instruction are determined. A target system type of the target terminal and a local system type are acquired. The target terminal is instructed to download the target application when the local system type is not matched with the target system type.

In one aspect, the at least one processor 42 is further configured to carry out the following actions. User data of the target application is acquired. The user data is migrated to the target terminal after the target terminal downloads the target application.

In one aspect, the at least one processor 42 is further configured to carry out the following actions. User data of the target application is acquired. Application data of the target application is acquired when the local system type is matched with the target system type. The user data and the application data of the target application are migrated to the target terminal.

In one aspect, the at least one processor 42 configured to carry out instructing the target terminal to download the target application is configured to carry out the following actions. Determine the target terminal in a Wi-Fi network. The target terminal is instructed to download the target application via the Wi-Fi network.

In one aspect, the at least one processor 42 is further configured to carry out the following actions. An application installation event is detected, and an installing application and files written-in corresponding to the application installation event are acquired. The files written-in are marked as application data of the installing application. Data written-in when running the installing application is marked as user data of the installing application.

In one aspect, the at least one processor 42 is configured to carry out the following actions. At least one first file corresponding to the target application is acquired and at least one second file marked as user data is selected, from the at least one first file acquired, as the user data of the target application.

In one aspect, the at least one processor 42 is further configured to carry out the following actions. A storage path of the user data of the target application is acquired and the storage path of the user data is transmitted to the target terminal.

In one aspect, the at least one processor 42 is further configured to carry out the following actions. A communication connection with the target terminal is established. The target system type of the target terminal and the local system type are acquired when the communication connection is established successfully, or a notification message indicating that the communication connection fails to be established is generated and displayed when the communication connection fails to be established.

In one aspect, the at least one processor 42 is further configured to carry out the following actions. Count time elapsed after determining the target application and the target terminal corresponding to the application migration instruction. A request for establishing the communication connection to the target terminal is sent when the time exceeds a preset threshold.

In one aspect, the external input interface 41 at least includes a network interface 412. The computer readable storage 43 may include an external memory 432 (e.g., a hard disk, an optical disk, or a floppy disk, etc.) and an internal memory 434. The output interface 44 can at least include a device such as a display screen 442. In this aspect, the operation of the method is based on computer programs, and program files of the computer programs are stored in the external memory 432 of the foregoing von Neumann architecture-based computer system, loaded into the internal memory 434 when running, and then transmitted to the at least one processor 42 for execution after being compiled into machine codes. Thus, the application-migration-instruction receiving unit 302, the system type determining unit 304, the user data acquiring unit 306, the target application downloading unit 308, the user data migrating unit 310, the application data migrating unit 312, the application installing unit 314, the user data marking unit 316, and communication connection establishing unit 318 are logically formed on the von Neumann architecture-based computer system. During the execution of the method for migrating data, input parameters are received via the external input interface 41, sent to the computer readable storage 43 for caching, and then input to the at least one processor 42 for processing. Result data processed is cached in the computer readable storage 43 for subsequent processing or sent to the output interface 44 for output.

The operations in the method of the present disclosure may be adjusted sequentially, combined, and deleted according to actual needs.

According to aspects of the present disclosure, a non-transitory computer readable storage medium is provided. The non-transitory computer readable storage medium is configured to store a computer program which, when executed by a processor, causes the processor to carry out all or part of operations of any of the methods described above. For example, the non-transitory computer readable storage medium can be a software installation package.

The units of the terminal in the aspects of the present disclosure may be combined, divided, and deleted according to actual needs. The terminal provided by the aspects of the present disclosure includes, but is not limited to, a terminal equipped with an IOS® system, an Android® system, a Microsoft® system, or other operating systems. The terminal is a mobile phone for example. Other terminals are also included, such as a laptop computer, a tablet computer, or a desktop computer having a touch-sensitive surface (e.g., a touch screen display and/or a touch pad).

In the following, take a terminal having a display and a touch-sensitive surface as an example. It should be understood that, the terminal may include one or more other physical user interface devices, such as a physical keyboard, a mouse, and/or a joystick, and the like.

The terminal typically supports a variety of applications, such as one or more of the following: drawing applications, rendering applications, word processing applications, web page creation applications, disk editing applications, spreadsheet applications, gaming applications, telephony applications, video conferencing applications, email applications, instant messaging applications, workout support applications, photo management applications, digital camera applications, digital video camera applications, web browsing applications, digital music player applications, and digital video player applications.

Various applications that can be executed on the terminal can use at least one shared physical user interface device, such as a touch-sensitive surface. One or more functions of the touch-sensitive surface and corresponding information displayed on the terminal may be adjusted and/or changed from one application to the next, and/or may be adjusted and/or varied within the respective application. In this way, the shared physical architecture of the terminal, such as a touch-sensitive surface, can support various applications with a user interface that is intuitive to the user.

Those skilled in the art can understand that all or part of operations of the methods described in the above aspects can be implemented by computer programs to instruct related hardware. The computer programs can be stored in a computer readable storage medium. The computer programs, when executed, are operable to implement operations described above. The computer readable storage medium may be a disk, compact disc (CD), a read-only memory (ROM), a random-access memory (RAM), and the like.

While the disclosure has been described in connection with certain aspects, it is to be understood that the disclosure is not to be limited to the disclosed aspects but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for migrating data, comprising: receiving an application migration instruction, and determining a target application and a target terminal corresponding to the application migration instruction; acquiring a target system type of the target terminal and a local system type; and instructing the target terminal to download the target application when the local system type is not matched with the target system type; wherein instructing the target terminal to download the target application comprises: determining the target terminal in a wireless fidelity (Wi-Fi) network; and instructing the target terminal to download the target application via the Wi-Fi network.

2. The method of claim 1, further comprising:
acquiring user data of the target application; and
migrating the user data to the target terminal after the target terminal downloads the target application.

3. The method of claim 1, further comprising:
acquiring application data and user data of the target application when the local system type is matched with the target system type; and
migrating the user data and the application data of the target application to the target terminal.

4. The method of claim 3, further comprising:
detecting an application installation event, and acquiring an installing application and files written-in corresponding to the application installation event;
marking the files written-in as application data of the installing application; and
marking data written-in when running the installing application as user data of the installing application.

5. The method of claim 4, further comprising:
acquiring at least one first file corresponding to the target application; and
selecting, from the at least one first file acquired, at least one second file marked as user data as the user data of the target application.

6. The method of claim 3, further comprising:
acquiring a storage path of the user data of the target application, and transmitting the storage path of the user data to the target terminal.

7. The method of claim 1, further comprising:
after determining the target application and the target terminal corresponding to the application migration instruction:
establishing a communication connection with the target terminal; and
acquiring the target system type of the target terminal and the local system type, when the communication connection is established successfully; or generating and displaying a notification message indicating that the communication connection fails to be established, when the communication connection fails to be established.

8. The method of claim 7, further comprising:
when the communication connection fails to be established, counting time elapsed after determining the target application and the target terminal corresponding to the application migration instruction, and sending a request for establishing the communication connection to the target terminal when the time exceeds a preset threshold.

9. A terminal, comprising: at least one processor; and a computer readable storage, coupled to the at least one processor and storing at least one computer executable instruction thereon which, when executed by the at least one processor, causes the at least one processor to carry out actions, comprising: receiving an application migration instruction, and determining a target application and a target terminal corresponding to the application migration instruction; acquiring a target system type of the target terminal and a local system type; and instructing the target terminal to download the target application when the local system type is not matched with the target system type; wherein the at least one processor configured to carry out instructing the target terminal to download the target application is configured to carry out actions, comprising: determining the target terminal in a Wi-Fi network; and instructing the target terminal to download the target application via the Wi-Fi network.

10. The terminal of claim 9, wherein the at least one processor is further configured to carry out actions, comprising:
acquiring user data of the target application; and
migrating the user data to the target terminal after the target terminal downloads the target application.

11. The terminal of claim 9, wherein the at least one processor is further configured to carry out actions, comprising:
acquiring application data and user data of the target application when the local system type is matched with the target system type; and
migrating the user data and the application data of the target application to the target terminal.

12. The terminal of claim 11, wherein the at least one processor is further configured to carry out actions, comprising:
detecting an application installation event, and acquiring an installing application and files written-in corresponding to the application installation event;
marking the files written-in as application data of the installing application; and
marking data written-in when running the installing application as user data of the installing application.

13. The terminal of claim 12, wherein the at least one processor is further configured to carry out actions, comprising:
acquiring at least one first file corresponding to the target application; and
selecting, from the at least one first file acquired, at least one second file marked as user data as the user data of the target application.

14. The terminal of claim 11, wherein the at least one processor is further configured to carry out actions, comprising:
acquiring a storage path of the user data of the target application, and transmitting the storage path of the user data to the target terminal.

15. The terminal of claim 9, wherein the at least one processor is further configured to carry out actions, comprising:
establishing a communication connection with the target terminal; and
acquiring the target system type of the target terminal and the local system type, when the communication connection is established successfully; or
generating and displaying a notification message indicating that the communication connection fails to be established, when the communication connection fails to be established.

16. The terminal of claim 15, wherein the at least one processor is further configured to carry out actions, comprising:
counting time elapsed after determining the target application and the target terminal corresponding to the application migration instruction, and sending a request for establishing the communication connection to the target terminal when the time exceeds a preset threshold.

17. A non-transitory computer readable storage medium storing a computer program which, when executed by a processor, causes the processor to carry out actions, comprising: receiving an application migration instruction, and determining a target application and a target terminal corresponding to the application migration instruction; acquiring a target system type of the target terminal and a local system type; and instructing the target terminal to download the target application when the local system type is not matched with the target system type; wherein instructing the target terminal to download the target application comprises: determining the target terminal in a wireless fidelity (Wi-Fi) network; and instructing the target terminal to download the target application via the Wi-Fi network.

18. The non-transitory computer readable storage medium of claim 17, wherein the processor is further configured to carry out actions, comprising:
acquiring user data of the target application; and
migrating the user data to the target terminal after the target terminal downloads the target application.

* * * * *